Patented Sept. 8, 1931

1,822,125

UNITED STATES PATENT OFFICE

CHARLES A. BLODGETT, OF SOUTH BREWER, AND HUGO H. HANSON, OF BANGOR, MAINE, ASSIGNORS TO EASTERN MANUFACTURING COMPANY, OF SOUTH BREWER, MAINE, A CORPORATION OF MASSACHUSETTS

METHOD FOR THE TREATMENT OF CELLULOSIC MATERIALS

No Drawing.        Application filed August 6, 1926. Serial No. 127,700.

This invention relates to a method for the purification of cellulosic raw materials, such as wood pulp, and to the resulting product which is characterized by unusual strength and by being especially suitable for the production of cellulosic compounds and solutions.

The various processes at present used for the preparation of wood pulp as in the manufacture of paper and similar products are usually differentiated by the means or methods used in their formation. In the mechanical process, the disintegration of the wood is brought about by the mechanical grinding of the same into a pulp, whereas in the chemical processes typified by the "sulfate", "sulfite" and "soda" processes, the raw cellulosic material (usually in the form of chips) is treated with a solution containing an alkali sulfide, and alkali sulfite or an alkaline hydroxide respectively. The latter group—or chemical processes—may also be broadly differentiated from one another according to the acid or alkaline characteristics predominating in the solution used. Upon this basis, the sulfite processes are fundamentally acid processes of treatment, whereas the soda and sulfate processes may be more properly regarded as caustic or alkaline.

As contrasted in terms of the relative effects upon the woods to which they may be applied, the mechanical process merely results in the physical comminution of the woods without substantially affecting its physical state or chemical properties, whereas the "chemical processes", so-called, accomplish in addition the substantial dissolution and removal of soluble material from and between the wood fibers.

The caustic or soda and sulfate processes are actively effective to dissolve resins and the like, as well as lower forms of cellulosic material. However, they also tend to cause the progressive degradation of the more resistant cellulosic component, namely the alpha cellulose, into more reactive and soluble forms, and hence tend to produce a soft pulp of weak fibers.

The acid or sulfite processes, on the other hand, effect the separation and removal of constituents of the wood, including lignin bodies and part of the resins, as well as certain celluloses such as the hemicelluloses or pentosans, but the reagents of these processes are relatively inactive both physically and chemically, toward the true or alpha cellulose compounds of the cellulosic raw material. Accordingly, in the sulfite processes as commonly carried on for the preparation of paper pulp, the sulfite cook, or digestion with an alkali metal bi-sulphite or alkali earth metal bi-sulfite solution with heat and pressure, may be continued for a comparatively long period of time at relatively high temperatures and pressures, resulting in a soft or so-called "easy bleaching" pulp which may have an appreciably modified physical structure but which still consists substantially of pure (e. g. 86%) alpha cellulose. For the purposes of this invention, the cook may, advantageously, be stopped before such ultimate degree of reduction, when the formation of a "prime strong" pulp has been reached (as is common practice for the preparation of a strong fiber) which is known as a "raw cook". At this stage, substantially all of the soluble, incrusting impurities are found to be removed but only an incomplete purification of the fibers has taken place.

While the caustic or soda process typically results in pulps which are soft, highly reduced, and associated with a relatively large proportion of so-called degraded cellulosic compounds, etc., and contain fiber which is not only weak per se but which forms a weak paper of soft and absorbent qualities,—the acid or sulfite processes may be so conducted as to produce a pulp which, though not so completely freed from the substances originally associated therewith, nevertheless contains a lower proportion of the degraded cellulosic compounds and is much stronger and may in turn be converted into paper or other products which are characterized by improved strength and uniformity of composition, and other desirable properties.

For the purpose of making cellulosic pulps or cellulosic materials of high purity and of properties other than or more exacting than those required for paper manufacture, it has heretofore been proposed (as described in co-pending application Serial No. 113,551 filed by us June 3, 1926) to subject such chemically prepared cellulosic materials or pulps generally to a second treatment, characterized by the use of a reactive compound of sulfur. It has further been disclosed in our application Serial No. 87,806 filed February 12, 1926, that pulp prepared by the sulfite processes, and more particularly by such a process which has been abbreviated or diminished in its intensity of action, may be employed for producing a pulp of an especially high degree of purity and with the physical integrity of its fibers substantially conserved. In the methods of the inventions disclosed in both of said applications, subsequent bleaching of the pulp may be resorted to for the improvement of color when this is an essential or desirable element in the finshed product.

It has now been found, as a part of the present invention that if cellulosic materials, —such as wood pulp prepared by the chemical procedures recited above,—are first subjected to a bleaching treatment, followed by a second treatment with a compound of sulfur reactive toward cellulosic material (as hereinafter to be defined) a greater degree of purity of the cellulose fibers may be obtained and that the operations may be more effectively and in some respects more efficiently carried out than by the procedures and sequence of steps heretofore practiced.

The method of the invention includes briefly, the preliminary reduction of appropriate raw materials,—usually wood,—to the condition of a pulp by ways now known, (or preferably by such procedures which have been restricted somewhat short of the duration or degree of activity to which they are ordinarily conducted for purposes of paper making)—a preliminary bleaching treatment (which also may be advantageously of diminished activity upon the pulp) a second treatment with a reactive compound of sulfur and the final removal of impurities and of any excess of the reagent materials employed. A final bleach, of very mild activity with respect to the pulp, may be imparted to the pulp effectively for improving the color without appreciably otherwise effecting the cellulose.

In the term "reactive compound of sulfur" is meant a compound or compounds of sulfur namely, sulfides and alkaline sulfites in which the sulfur constituent or radical is susceptible of reaction with contaminant cellulosic substances present, as manifested for example by the formation of soluble compounds therewith. The compounds which fall within this definition, include those containing one or more atoms of sulfur which are characterized by manifesting a lower valence (2 or 4) in association with the molecular structure of the compound and are reactive in the manner described in an alkaline medium. The alkaline medium is provided by the basic composition of the compound itself in the case of sulfides and, with sulfites by the positive addition of an alkaline reagent thereto. Obviously, a further qualification of such compounds, in order to be considered applicable for the purposes of the invention, is that they shall be soluble,— and for practicable application that they shall exhibit ready solubility in water.

On the other hand, insoluble compounds of sulfur and compounds in which the sulfur component exerts a high valence, as in the sulfates for example, are ineffective for the purposes of this invention and are not to be included by the term "reactive compound of sulfur" as employed in the specification and claims.

A preferred and typical reactive compound of sulfur is sodium sulfide or polysulfide which is intrinsically basic and which in solution provides an alkaline medium in which its desired association reaction with active derivatives of cellulose is readily effective. Again, sodium sulfite, to which a soluble alkali may be added such as sodium hydroxide, is also especially adapted to the purposes and application of the invention. Other compounds of sulfur of analogous composition or having a like form of reactive sulfur in their molecular composition may likewise be employed.

One example of procedure under the present invention will now be described in its application to pulps prepared by the sulfite process in which the raw material is first subdivided in the presence of an acid pulping reagent,—usually the bisulfite of one or more of the alkaline earth metals. The pulp is then bleached, for example by the usual bleaching procedure,—or preferably by a somewhat less active bleaching operation, conveniently controlled by restricting the amount of bleach used. This is followed by washing and by a second stage treatment of the pulp thus obtained, which is characterized by subjecting the pulp to a solution containing the reactive sulfur compound, which is preferably alkaline per se or rendered alkaline by the addition of caustic thereto. The pulp is then freed from the several reagent materials used and from the dissolved products of reaction. A further bleaching of the pulp may be effected though by a less drastic treatment, or an especially satisfactory bleaching of the pulp may be attained by the procedure disclosed and claimed in the co-pending application of C. A. Blodgett, Serial No. 88,684 filed Feb. 16, 1926.

For effecting the purposes of this invention in actual practice, the preliminary treatment may, as already indicated, be advantageously restricted in degree or duration or both, to such an extent as to leave the fibrous structure thereof substantially unaffected and the non-cellulose admixtures incompletely removed, (as in pulps resulting from a "raw cook" and known as "prime strong"). Alternatively, the preliminary treatment may be more actively conducted or more prolonged or both, so as to produce a pulp somewhat weaker and of softer texture and containing less of the wood residue other than cellulose, in which case it is characterized in the trade as "easy bleaching". The procedure followed in any given instance will obviously be made to depend upon the corresponding ultimate result desired.

For conserving strength of fiber and attaining the production of a pulp of high strength as well as of high purity, however, it is now found to be desirable and practicable, by the procedure herein disclosed, to give the raw material a comparatively short acid cooking treatment,—even shorter for example or less active than that usually employed in making a "prime strong" sulfite pulp,—followed by washing the reagent and reacting materials therefrom.

In an illustrative procedure, to which the invention is by no means limited the raw wood is first reduced mechanically to the condition of chips and the chipped wood may then be mixed with a sulfite liquor of a desired concentration (containing e. g., 0.6% $SO_2$ combined as $Ca(HSO_3)_2$, 0.4% $SO_2$ combined as $Mg(HSO_3)_2$, with 3%–5% $SO_2$ in the form of free sulfurous acid) and in substantially the proportions of 1½ gallons liquor to 1 lb. of the air dry pulp and then subjected to heating, to a final pressure and temperature of the order of 65–70 lbs. per square inch and 295° F., respectively. Preferably, the degree of digestion and of the conversion and removal of associated impurities may be such as is indicated by a final acid concentration equivalent to 0.14% to 0.20% total $SO_2$. In certain cases a still further removal of the impurities may be effected by prolonging the heat treatment at or about the highest temperature above stated for a further period of time.

The thus obtained "raw cooked" pulp is washed and screened, after which it may be first shaped into wet laps or may be passed through a thickener and thence directly to the subsequent operations.

The pulp is then bleached, and if the usual course of procedure is followed, bleaching powder or other source of chlorine in amount equal to 10–12% (if bleaching powder is used) of the weight of the dry pulp is employed, followed by thoroughly washing the pulp. When a later or final bleach is contemplated, the amount of bleach used in the preliminary stage may be materially reduced.

The apparatus used for the secondary treatment may conveniently consist of the usual form of rotary boiler used for boiling rags. Into this the pulp is charged in appropriate proportions with the treating solution. For example, the liquor ratio may vary from five to fifteen parts by weight of the solution to one of the pulp, but the ratio is preferably about eight to one ordinarily. The treating solution contains some 3% more or less of reagents in the aggregate and preferably, in the specific instance, approximately equal parts of sodium sulfite and caustic soda or sodium sulfide. As an example illustrative of carrying the process into effect the raw material may be treated for four to four and a half hours with a solution containing 1.6% sodium hydroxide and 1.2% sodium sulfite. The charge as thus prepared is heated slowly and preferably with agitation as by rotation of the boiler at a rate conveniently governed by the indicated steam pressure or by the temperature.

At the end of the cooking period, the charge may be transferred to a draining vat, and the liquor withdrawn from the pulp, which pulp is washed with a quantity of fresh water. If the washing is carefully done, the original liquor and washings thus produced may with economy be re-used, with addition of fresh reagent, or concentrated for recovery in other ways. After washing, there is left a purified pulp, high in alpha cellulose.

The pulp may now be carried direct to the customary treatments or processes for working the same up into paper stock and the like, or it may be employed for chemical purposes, as in the manufacture of cellulosic compounds. For many purposes, however, it is desirable to further bleach the pulp, especially when a high colored, or extremely white, pulp and final product are desired. This may advantageously be effected by other mild and, otherwise practicable bleaching reagent or by the process disclosed in copending application of Charles A. Blodgett, Serial No. 88,684 filed February 16, 1926, already alluded to.

In the latter case, the pulp may be subjected to a brief reducing bleach, as by treatment with sodium bi-sulfite, followed by a mild oxidizing bleaching treatment, as with bleaching powder. The oxidizing bleach reaction is expended or else checked short of its complete reactivity, preferably by controlling the bleaching reagent initially added to such proportions as to impart an incomplete bleaching effect only and calculated to expend itself before appreciable oxidation of the cellulosic substance of the pulp occurs. This treatment is preferably followed by a reducing bleach, as by the addition of sulfur dioxide or fresh bi-sulfite liquor, whereupon certain oxidized or chlorinated components of the pulp are modified, destroyed or converted into white colorless substances probably in the nature of addition products, and a white alpha-cellulose results.

In the procedure of the present invention one half to two percent of oxidizing bleach is sufficient for this final bleaching, where a fully bleached pulp has been used as the initial material,—with a reaction period of twenty minutes at 60° F. Where quarter bleach or half bleach pulp has been employed, the amount of bleach to be used will be modified accordingly.

Where fibre strength and structure are of secondary importance, the initial sulfite digestion may advantageously be prolonged, as, for example, to the extent of forming an easy bleaching pulp. It is to be understood that the examples above given are merely illustrative, and may be varied within a wide range and still conserve the essence of our invention.

The application of the invention as herein set forth results in the formation of a purified wood pulp which is of relatively high alpha-cellulose content, comparatively low soda-soluble percentage, of low ash, and especially suitable for esterification and etherification purposes, either where the cellulose is not dissolved in the esterizing bath as in the formation of the nitrated celluloses, or where the cellulose goes into solution in the esterification bath as in the treatment of cellulosic bodies with organic acids as in the acetylation of cellulose. It has also been found that wood pulp prepared and purified as described herein is especially suitable for the formation of cellulose ethers, as in the ethylation of cellulose by ways now known, and that the cellulose ethers formed have in a high degree the desirable characteristics required of the cellulose ethers for commercial applications, especially in the manufacture of films, sheets and filaments. It has also been found that the purified cellulose as produced by our invention readily dissolves in cuprammonium solutions, in solutions of zinc chloride and in solutions of other reagents such as sodium hydroxide with carbon bisulfide, from which solutions the cellulose may be precipitated and recovered in forms desired, as known to those skilled in the art.

In the manufacture of nitrated celluloses, it is desirable that the purified cellulose shall be as free as commercially possible from incrusting bodies and have a high content of resistant or alpha-cellulose. Such pulp produced in accordance with our invention nitrates freely and uniformly and produces nitric esters of high yield, uniform and easy solubility, satisfactory stability, and of a wide range of viscosities depending upon the nature of the treatment to which the cellulose had been subjected and the factors governing the esterification process. Furthermore, the nitro-cellulose produced washes free from acid with facility.

In the formation of organic cellulosic esters as typified by the acetated celluloses, the purified wood cellulose as resulting from our process goes uniformly and slowly into solution in the esterifying bath composed of glacial acetic acid, acetic anhydride and the desired catalyzer, and after the acetation process has been prolonged to the point desired, the mass hydrolyzes uniformly to the plasticity and solubility in solvents required as well understood by those skilled in the art of acetation and partial hydration of cellulose. In the acetation process before partial hydration or "ripening" the wood cellulose as prepared in accordance with our invention gradually and uniformly goes into solution in the acetating bath to a uniform and indistinguishable mass, free from unacted upon or partially acted upon fibers, in which respect it deports itself in a much more satisfactory manner and in a less period of time than does cotton cellulose under analogous acetating treatment. Furthermore, at the conclusion of the partial hydration treatment subsequent to acetation, the acetated cellulose is precipitated in a very flocculent and loose condition, easily washed free from reacting components and purified therefrom with a minimum of washing. On account of the apparent porosity of the acetated wood cellulose in respect to acetated cotton cellulose, the ester loses its contained water uniformly and at comparatively lower temperatures.

In the employment of four purified cellulose for etherification purposes, specifically ethylation purposes, as in the formation of the ethyl-celluloses, the purified wood cellulose as produced by our process is readily and uniformly acted upon in the initial or preliminary mercerization step, and upon addition of the alkylating bodies, an example being diethyl sulfate if the ethylated cellulose is to be produced, the ethylation takes place slowly and uniformly, resulting in the production of alkyl cellulose derivatives of ready solubility in a wide range of solvents and solvent combinations, of high stability and readily purified from reacting components.

It will be obvious to those skilled in the art to which our invention applies, that various modifications and adaptations of the procedure described may and probably will be resorted to in practice, but that such modifications and adaptations are to be considered as comprehended and included by the above disclosure and within the scope of the following claims:—

We claim:

1. A method for the treatment of cellulosic materials, which comprises reducing the same to the condition of a pulp by a sulfite process, bleaching, and treating the resulting pulp with a reactive compound of sulfur in alkaline solution.

2. A method for the treatment of cellulosic materials, which comprises reducing the same to the condition of a pulp by a sulfite process, bleaching, and treating the resulting pulp with a solution containing an alkali sulfite in alkaline solution.

3. A method for the treatment of cellulosic materials, which comprises reducing the same to the condition of a pulp by a sulfite process, bleaching, and treating the resulting pulp with a solution containing sodium sulfite and sodium hydroxide.

4. A method for the treatment of cellulosic materials, which comprises reducing the same to the condition of a pulp by a sulfite process, partially bleaching, subjecting the pulp to a reactive compound of sulfur, and subjecting the treated pulp to a final bleaching reagent in two successive stages, the first being the more active.

5. A method for the treatment of cellulosic materials, which comprises reducing the same to the condition of a pulp by a sulfite process, partially bleaching, subjecting the pulp to a reactive compound of sulfur at an elevated temperature, and finally bleaching the treated pulp with a relatively strong bleaching agent, followed by bleaching with a restricted quantity of bleaching agent.

6. A method for the treatment of cellulosic materials, which comprises reducing the same to the condition of a pulp by a sulfite process, partially bleaching, subjecting the pulp to a reactive compound of sulfur at an elevated temperature, bleaching the treated pulp with a relatively strong oxidizing bleaching agent, removing the excess of reagent, and finally bleaching with a restricted quantity of oxidizing bleaching agent followed by subjecting the pulp to a reducing bleach.

7. A method for the treatment of cellulosic materials, which comprises reducing the same to the condition of a pulp by the sulfite process, checking the effects of the reagents appreciably short of completion, subjecting the resulting pulp to a partial bleach with an alkali-soluble bleaching reagent, and finally treating the same with a reactive compound of sulfur.

8. A method for the treatment of cellulosic materials, which comprises reducing the same to the condition of a pulp by the sulfite process, checking the effects of the reagents appreciably short of completion, subjecting the resulting pulp to a partial bleach with chlorine, and finally treating the same with a reactive compound of sulfur.

9. A method for the treatment of cellulosic materials made from sulfite pulp, comprising subjecting the same to a preliminary bleach and washing, followed by a secondary treatment with an alkaline solution containing sodium sulfite and finally the removal of reagent materials and impurities therefrom.

10. A method for the treatment of cellulosic materials made from sulfite pulp, comprising subjecting the same to an alkali-soluble bleaching agent, followed directly by a secondary treatment with an alkaline solution containing sodium sulfite and finally removing the reagent materials and associated impurities therefrom.

11. A method for the treatment of cellulosic materials made from sulfite pulp, comprising subjecting the same to an alkali-soluble bleaching agent, and expressing the excess of bleaching solution, followed directly by a secondary treatment with an alkaline solution containing sodium sulfite and finally removing the reagent materials and associated impurities therefrom.

12. A method for the treatment of cellulosic materials made from sulfite pulp, comprising subjecting the same to a preliminary restricted bleaching, a secondary treatment with an alkaline solution containing sodium sulfite, and the final removal of the reagent materials and associated impurities therefrom.

13. A method for the treatment of cellulosic materials made from sulfite pulp, comprising subjecting the same to a preliminary restricted bleaching, by limitation of the quantity of bleaching reagent used, a secondary treatment with an alkaline solution containing sodium sulfite, and the final removal of the reagent materials and associated impurities therefrom.

14. A method for the treatment of cellulosic materials made from sulfite pulp, which comprises reducing the same to the condition of a pulp by a chemical process, bleaching, removing the previously employed reagents therefrom, and subjecting the resulting pulp to an alkaline solution containing sodium sulfite.

Signed by us at South Brewer, Maine, this 31st day of July, 1926.

CHARLES A. BLODGETT.
HUGO H. HANSON.